United States Patent
Weston et al.

[11] Patent Number: 5,879,488
[45] Date of Patent: Mar. 9, 1999

[54] METHOD OF FORMING TIRE WITH A PROFILED INNERLINER

[75] Inventors: David Alan Weston, Taylors; Cesar Enrique Zarak, Greenville, both of S.C.

[73] Assignee: Michelin Rēcherche et Technique S.A., Switzerland

[21] Appl. No.: 451,171

[22] Filed: May 26, 1995

Related U.S. Application Data

[62] Division of Ser. No. 373,915, Jan. 17, 1995, abandoned, which is a continuation of Ser. No. 119,934, Sep. 10, 1993, abandoned.

[51] Int. Cl.⁶ .............................. B29D 30/06; B60C 5/14
[52] U.S. Cl. ............................. 156/64; 73/146; 152/510; 156/110.1; 156/123
[58] Field of Search ........................... 152/510, DIG. 16; 156/123, 133, 110.1, 64; 73/146

[56] References Cited

U.S. PATENT DOCUMENTS

| | | | |
|---|---|---|---|
| 2,588,097 | 3/1952 | Adolfo . | |
| 3,062,257 | 11/1962 | Campbell | 152/510 |
| 3,495,645 | 2/1970 | Gough | 152/330 |
| 4,150,567 | 4/1979 | Prevorsek et al. | 73/146 |
| 4,282,918 | 8/1981 | Tomoda et al. | 152/510 |
| 4,938,506 | 7/1990 | De Rudder et al. | 73/49 |
| 5,005,625 | 4/1991 | Klemmensen et al. | 152/510 |
| 5,040,583 | 8/1991 | Lin et al. | 152/510 |
| 5,156,921 | 10/1992 | Lin et al. | 428/521 |
| 5,280,817 | 1/1994 | Liu et al. | 152/510 |

FOREIGN PATENT DOCUMENTS

| | | | |
|---|---|---|---|
| 244602 | 12/1985 | Japan | 152/510 |
| 50807 | 3/1993 | Japan | 152/510 |
| 180305 | 4/1922 | United Kingdom . | |

OTHER PUBLICATIONS

The Vanderbilt Rubber Handbook, 13th Ed., 1990, pp. 115–118, 535–538.
American Society for Testing & Materials, Designation D454–88, 1988.
American Society for Testing & Materials, Designation D572–88, 1988.
Mechanical Engineering, Journal 1989, p. 57.

*Primary Examiner*—Geoffrey L. Knable
*Attorney, Agent, or Firm*—Alan A. Csontos; Robert R. Reed

[57] ABSTRACT

The innerliner ply of a tire has been modified in thickness to provide a profiled innerline ply. A permeability relationship is established for the material of the innerliner that allows the average thickness of the innerliner ply to be adjusted based on its temperature. The maximum and minimum thickness are located in relation to the maximum and minimum internal temperature locations within the tire. A gradual change in thickness is used between the maximum and minimum thickness locations. An object of the invention is to limit the air flow through the tire in locations which have a high internal temperature. This limited air flow will improve the deterioration of rubber products in the tire and maintain an allowable inflation pressure air loss rate.

5 Claims, 4 Drawing Sheets

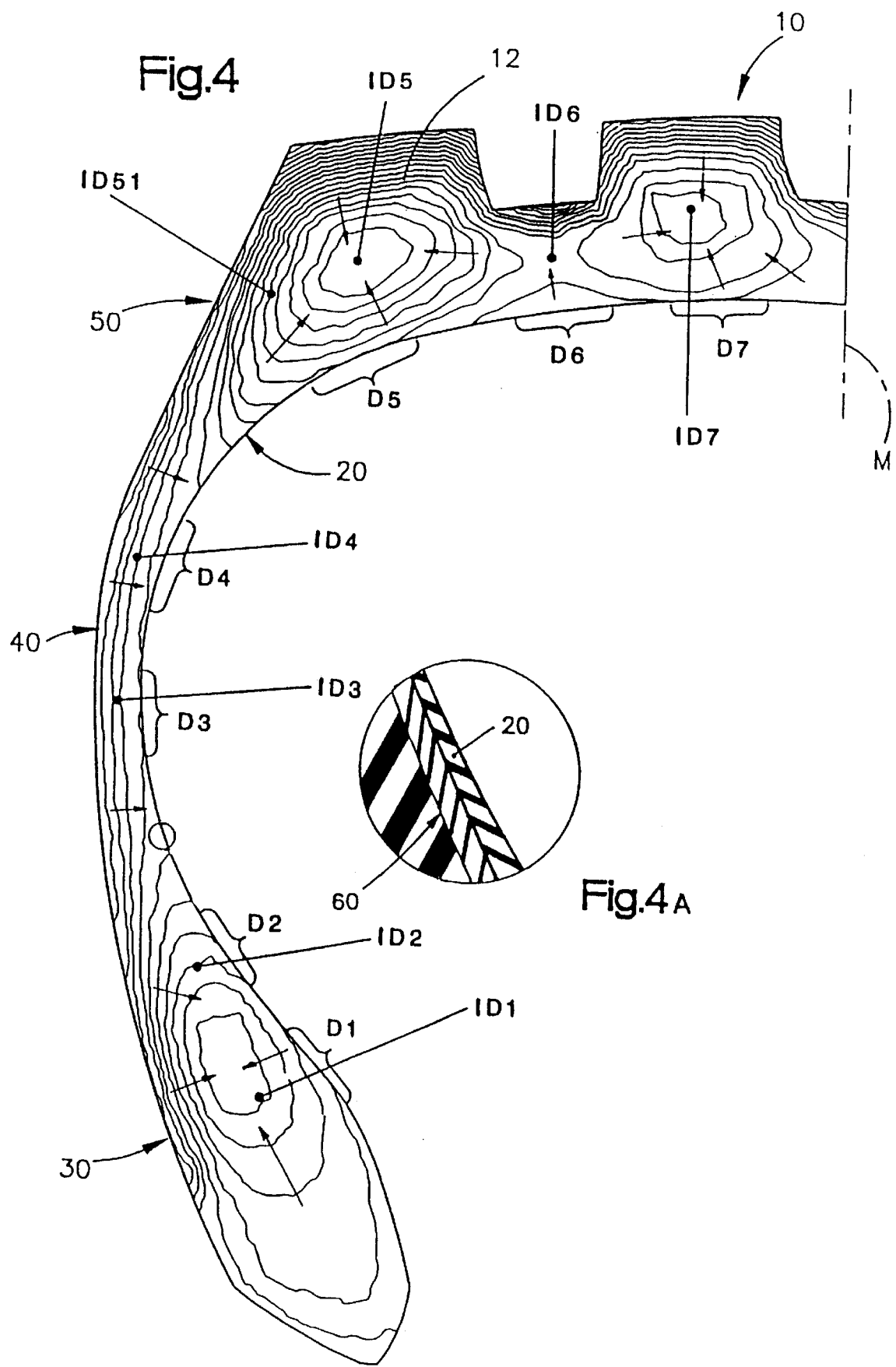

METHOD OF FORMING TIRE WITH A PROFILED INNERLINER

This is a divisional of application Ser. No. 08/373,915 filed 17 Jan. 1995, now abandoned, which is a FWC of Ser. No. 08/119,934, filed on 10 Sep. 1998, now abandoned.

BACKGROUND OF THE INVENTION

1) Field of the Invention

This invention relates to pneumatic tires and more specifically to tubeless tires that more effectively control inflation air loss rate during nominal operating conditions and impede the aging of materials.

2) Description of Related Art

The ability of a pneumatic tire to maintain its inflation pressure has a major effect on the performance and endurance of the tire. The tire designer selects the position, strength and configuration of various components within the tire based on an assumed tire shape which is controlled during use of the tire.

For example, a tire which is not properly inflated can have significant overall wear or significant irregular wear over the tread width. It is also well known in the art that increasing the inflation pressure lowers the rolling resistance to achieve less fuel consumption.

The vehicle operator is expected to maintain the proper inflation pressure in each tire. Frequent inspections of the tires and a checking of inflation pressure is required. It is known that air permeates from within a tire at a slow rate. However, over time this can result in a significant loss in inflation pressure. For example, a truck tire starting with an 85 psi inflation pressure can have a 2–3 psi inflation pressure loss per month, due to air permeability through the tire. U.S. Pat. No. 4,938,056 discloses maximum air loss requirements for passenger car tires. For example, a P205/75R15 tire should have a maximum loss rate of no more than 2.5 percent per month.

Tires of the well known tubeless variety maintain their inflation pressure by using a thin innerliner rubber ply which is bonded to the inside of the tire and extends from one bead segment to the axially opposite bead segment. This innerliner ply is made from a rubber composition having an excellent air retention capability. That is, the "permeability" of the innerliner ply is very low. It is not unusual for this innerliner ply material to have a permeability one order of magnitude less than that of the other rubber components of the tire. To avoid adding additional mass to the tire, the most efficient innerliner plies are those that have the lowest permeability at a minimum thickness controllable in the manufacturing process.

The most commonly used rubber compounds for the tire's innerliner ply are of a butyl or halobutyl composition having a sulfur or zinc oxide cure system. Typically, the halobutyl is a bromobutyl or chlorobutyl rubber. Other innerliner plies are composed of blends of rubber to achieve a thinner innerliner ply, such as those disclosed in U.S. Pat. Nos. 5,040,583, 5,005,625 and 5,156,921.

According to U.S. Pat. No. 5,040,583 the innerliner for a 15 inch tire with a single 55 mil thick halobutyl rubber innerliner ply weighs about 10 percent of the total weight of the tire. The patent discloses a laminated innerliner ply having one layer of a non-elastomeric barrier material of low permeability which reduces the 55 mil thick halobutyl innerliner ply to a 25 mil thick laminated innerliner ply. U.S. Pat. No. 5,156,921 discloses the use of a non-elastomeric barrier layer of polyvinylidene chloride or ethylenevinyl alcohol copolymer film to obtain equal or better air retention properties with a substantial reduction in thickness and mass over butyl or halobutyl rubber innerliner plies. In U.S. Pat. No. 5,005,625, a blend of an acrylonitrile/butadiene copolymer rubber with a butyl, chlorobutyl or bromobutyl rubber resulted in innerliner plies having a thickness in the range of about 31 mils to 78 mils. Therefore, it is known to vary the rubber compound in the innerliner ply to achieve more control on the inflation pressure loss. However, the most cost effective innerliner ply continues to be one made using a butyl or halobutyl compound rubber. The tire industry's preferred innerliner ply has a halobutyl compounded rubber at a constant thickness to achieve an overall acceptable of inflation pressure loss rate. The measure of acceptability is based on a "permeability coefficient" which will be described in more detail herein.

Tire endurance is reduced by loss of inflation pressure between intervals of pressure maintenance as well as deterioration of the rubber components with age. The deterioration of vulcanized rubber is well known to be accelerated in a high temperature environment.

If a constant thickness innerliner ply is used in a tire, the air will permeate more rapidly in those areas of the innerliner ply having a higher temperature. Permeability as a function of temperature will be discussed in more detail in the disclosure. Higher innerliner ply temperatures are found at locations relative to the higher internal tire temperature locations. Therefore, there is a need for an innerliner ply to have not only an average thickness (to reasonably maintain the tire's inflation pressure), but also an increased thickness in areas adjacent to high internal temperature locations within the tire (to limit the accelerated aging of the rubber components within the tire).

In the U.S. Pat. No. 3,495,645 the innerliner on one or both sides of the mid-sidewall region is made to have a greater thickness. This thickness increase leads to a reduction in vibrations transmitted to the wheel, which are generated by the tire's engagement with the ground. This innerliner feature further reduces the surge in driving torque transmitted through the tire. Thickness increases can be in either the shoulder region, the bead region, or both. These thickened areas are of a constant thickness twice to five times thicker than the mid-sidewall regions. Abrupt changes in thickness are relative to physical locations of the shoulder 15 and the bead region 6 regardless of the internal temperatures within the tire.

The art discloses inner tubes for tires have been used which have variations in their wall thickness. Two examples of this are in U.S. Pat. No. 2,588,097 and in United Kingdom Patent No. 180305 (GB). The greatest thickness of these inner tubes is at an outer tread portion and the smallest thickness is at a rim contact portion. These patents are directed to improved puncture resistance and do not teach or suggest the need for a profiled innerliner ply to achieve tire inflation pressure retention along with better aging protection.

SUMMARY OF THE INVENTION

An object of the present invention is to provide a tire having an innerliner ply which is profiled in consideration of selected internal temperature locations within the tire such that the air permeability through the innerliner ply is advantageously controlled and the weight of the innerliner is optimized.

Another object of the invention is to provide a tire having a profiled innerliner ply with an average thickness to maintain tire inflation pressure and an increased thickness adjacent to highest internal temperature locations within the tire to limit air permeability for improved durability.

A further object of the invention is to provide a method for determining and locating increases and decreases in the thickness of the innerliner ply of the tire to achieve a profiled thickness.

Any rubber compound of a material which acts as an innerliner to reduce the permeability of air can be used in the present invention. The method for determining in a pneumatic tire a profiled thickness for an innerliner ply comprises the steps of determining the internal temperatures of the tire at selected locations and adjusting the thickness of the innerliner ply at the locations in relation to the temperatures thereof. In a basic embodiment of the invention a innerliner ply for a pneumatic tire has a pair of spaced apart locations characterized by respective permeability values A first location has a permeability value in relation to a first internal temperature within the tire and a second location has another permeability value in relation to a second internal temperature within the tire.

In the method embodiment of the present invention, a further set of steps for determining a profiled innerliner ply for a pneumatic tire is given. In a first step, a desired shape of the tire is predetermined. The desired shape includes predetermining an inflation pressure and an allowable loss rate in the inflation pressure that will maintain the desired shape of the tire. The second step includes selecting a material for the innerliner ply. A third step is to determine a plurality of permeability coefficients and a permeability versus temperature relationship for the material. In a fourth step, an average thickness of the innerliner ply is determined using an inflation pressure loss model. The inflation pressure loss rate shall be no more than a predetermined allowable value. The tire is modeled in the fifth step to determine internal temperature values of the tire during rolling contact with a supporting surface. The model simulates nominal conditions of load and inflation pressure of the tire. The final step six is for adjusting the innerliner ply thickness at locations adjacent to the cavity of the tire in relation to at least one maximum and at least one minimum value of the internal temperature values within the tire in accordance with the permeability relationship. The result is the profiled thickness which varies between the adjusted thickness locations.

In a further embodiment of this invention, an improved pneumatic tire is achieved. The improved tire has a tread and a belt package between a pair of shoulder portions, a pair of bead segments axially spaced apart, a sidewall portion between each shoulder portion and a respective bead segment and a carcass with at least one reinforced ply extending between and attached to a respective bead segment. The improvement comprises a profiled innerliner ply characterized by a minimum and a maximum thickness. The minimum thickness is located in relation to at least one lowest internal temperature location within the tire. The maximum thickness is located in relation to at least one highest internal temperature location within the tire. The highest and lowest internal temperatures being associated with the tire during nominal operating conditions of load and pressure. The improvement is that the inflation pressure loss rate in the tire is within a predetermined allowable value while the rate of aging of rubber materials within the tire is reduced.

Yet another embodiment of the present invention generically relates to pneumatic tires and in particular to heavy duty pneumatic tires. The pneumatic tire has a crown portion with a tread and a belt package extending between two shoulder portions, a pair of bead segments axially spaced apart, a sidewall portion extending between each shoulder portion and a respective bead segment, a carcass with at least one reinforced ply extending between and attached to a respective bead segment and an innerliner ply. The innerliner ply comprises a rubber compound having the air permeability coefficient Q in the range of about 2450 ($cm^3 \cdot mil/m^2 \cdot atm \cdot day$) at 35° C. to about 4600($cm^3 \cdot mil/m^2 \cdot atm \cdot day$) at 35° C. The innerliner ply has a profile characterized by a minimum thickness adjacent to at least one lowest internal temperature location within the tire and a maximum thickness adjacent to at least one highest internal temperature location within the tire. The internal temperatures are those which exist within the tire during nominal operating conditions of load and inflation pressure. A further embodiment of this other embodiment is that the minimum thickness of the innerliner ply is in a range of about 50 percent to about 70 percent of the maximum thickness for a heavy duty truck tire.

BRIEF DESCRIPTION OF THE DRAWINGS

Further features of the present invention will become apparent to those skilled in the art to which the present invention relates from reading the following specifications with reference to the accompanying drawings, in which:

FIG. 4 is a half cross-sectional view of a tire showing temperature contours within the tire during rolling contact with a supporting surface and FIG. 4A is an inner surface detail.

DESCRIPTION OF THE PREFERRED EMBODIMENTS

Figure 1:
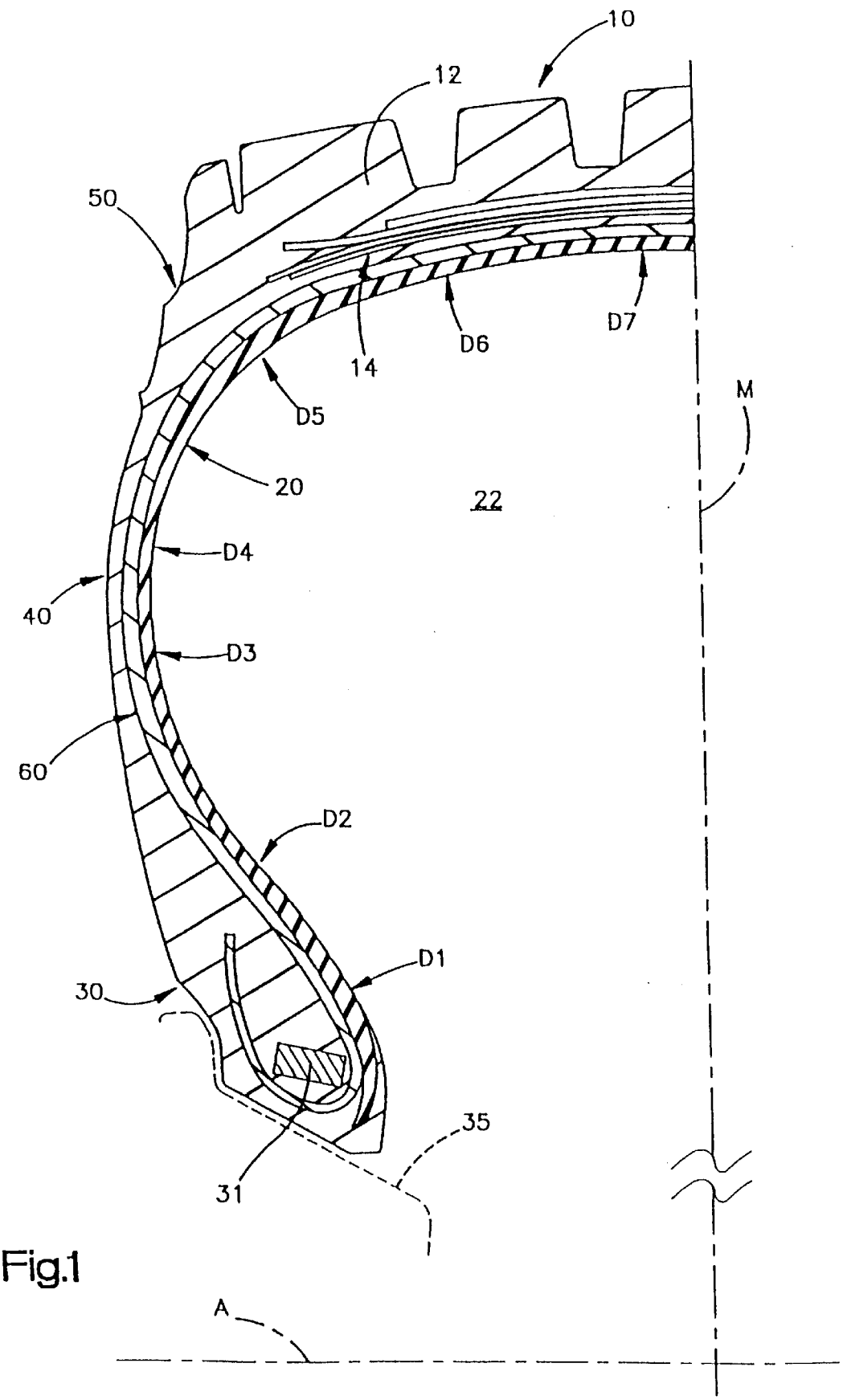
FIG. 1 is a half cross-sectional view of a heavy duty tire having a profiled innerliner ply according to the invention.

A vehicular tire 10 rotating about an axis of rotation A and having a profiled innerliner ply 20 is illustrated in the half cross-section in FIG. 1. The tire 10 is symmetrical about a midcircumferential plane M, with only half of the cross-section being illustrated. The tire 10 has a cavity 22 inflated with air under pressure as recommended by the tire and vehicle manufacturers for proper performance under nominal operating conditions. This tire 10 is of a type commonly called a tubeless pneumatic tire.

The tire 10 has a tread 12 that contacts a roadway surface. A belt package 14 interior to the tread 12 helps support the loaded tire. A pair of bead segments 30 (only one of which is seen in FIG. 1) each have a bead core 31 and the two bead segments together support the tire on a vehicle rim 35. The bead cores 31 help to hold the bead segments 30 against the rim 35 to basically eliminate loss of air from the tire cavity 22 at the tire to rim interface. A sidewall portion 40 of the tire extends between each respective bead segment and a respective shoulder portion 50. The shoulder portions 50 are at both lateral edges of the tread 12 and belt package 14. A torodial carcass 60 with at least one reinforced ply extends between respective bead segments 30 and becomes a part of bead segments 30 by being wrapped around each bead core 31.

The carcass 60 is under tension due to the inflation pressure in the cavity 22 which also helps support the loaded tire. The innerliner ply 20 helps maintain the inflation pressure by having a low permeability to air. Reduced inflation pressure gives reduced tension in the carcass and a reduction in the load carrying capability of the tire 10. Increased tire deformations produce higher internal tire temperatures, reduce tire endurance, and increase rolling resistance. Therefore, the importance of a proper inflation pressure is essential to tire endurance. Maintaining inflation pressure by limiting the loss of air from the tire's cavity 22 can be achieved with a constant thickness innerliner ply. However, the profiled (or variable thickness) innerliner ply 20 of this invention is advantageous by achieving optimum protection with little or no increase in mass or cost of material.

Having a profiled innerliner in this invention is defined as an innerliner having variations in permeability from one location to another adjacent to the internal cavity 22 within the tire 10. This variation in permeability can be achieved with laminated innerliner plies or changes in innerliner materials from one location to another around the internal surface of the tire. However, the preferred innerliner ply is one that has the same material with a variable thickness perpendicular to the internal surface of the tire.

Figure 2:
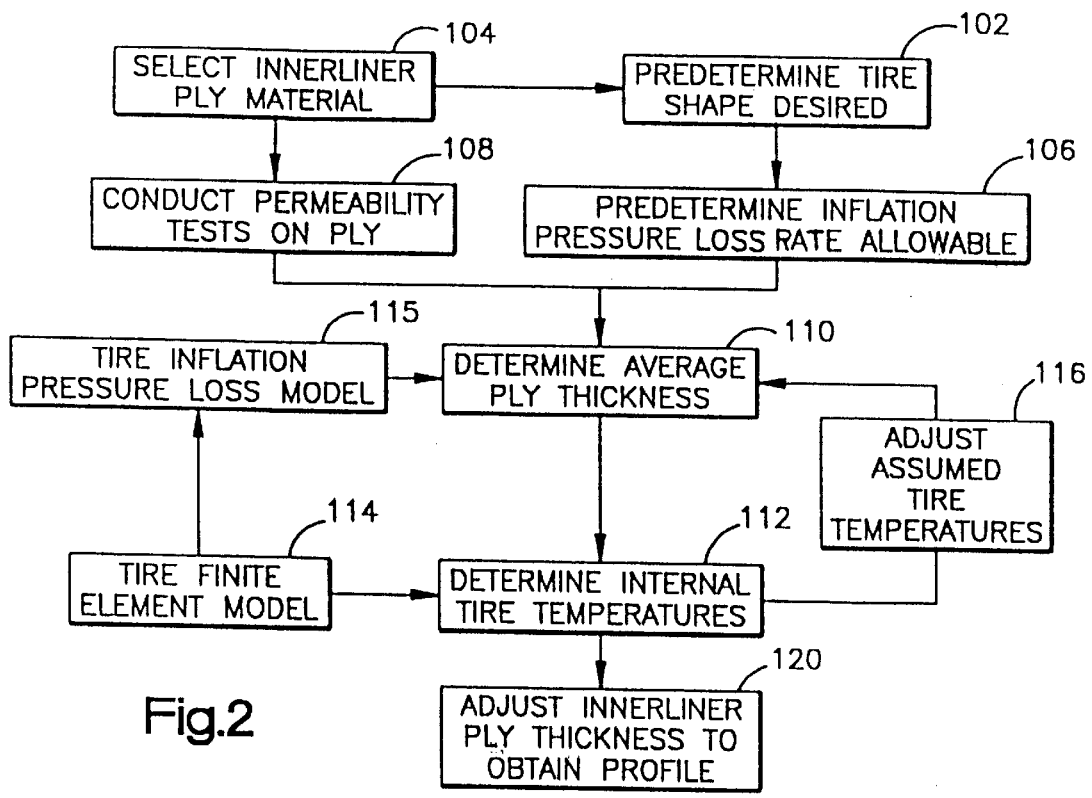
FIG. 2 is a method schematic flow diagram showing the steps to obtain a profiled innerliner ply for a tire.

A flow diagram of the preferred method used to obtain an optimum profiled innerliner ply 20 is illustrated in FIG. 2. The tire 10 has a predetermined shape including its aspect ratio, carcass profile, tread contour, bead spacing and overall size as indicated in operation 102. The scope of this invention includes pneumatic tires of all types including passenger cars, light trucks, heavy trucks and the like which depend on maintaining a proper inflation pressure for optimum performance and durability.

Vehicle manufacturers and operators have established requirements for the allowable loss of tire inflation pressure in a given time, or an allowable pressure loss rate. For example, one manufacturer requires the mounted passenger car tire at a temperature of 25° C. in a controlled environment for 6 months to have an inflation pressure loss less than 2.5 percent per month. The allowable inflation pressure loss rate is predetermined by the vehicle or tire manufacturer as indicated in operation 106 of FIG. 2. This establishes threshold air permeability rates for the tire.

The innerliner ply material is selected as indicated in operation 104 of FIG. 2. It is desirable within the scope of this invention to predetermine the preferred selection of the innerliner ply material. However, any rubber compound or material which is used as an innerliner to impede the permeability of air is useful in this invention. The most commonly used innerliner materials are butyl and halobutyl compounds. The innerliner material used for illustration of the best mode by the applicant is a halobutyl compound selected from chlorobutyl rubber, bromobutyl rubber and blends thereof. The preferred glass transition temperature of this material is in the range of about 60 C. to about 65 C. These materials are known to have low permeability to air, being in a range of an order of magnitude better than natural rubber. The innerliner ply selection can be influenced by the predetermined tire shape, as illustrated by the flow chart connection between operations 102 and 104.

After predetermining the tire shape, selecting the innerliner ply material and obtaining the allowable inflation pressure loss rate to maintain an acceptable tire performance in operations 102, 104, and 106 of FIG. 2, the air permeability of the ply is determined by, for example, analysis of permeability verses temperature data on the innerliner ply material. This step is illustrated by operation 108 in FIG. 2. If the air permeability of the ply material is not already known, the permeability tests and apparatus disclosed herein can be used to obtain the necessary physical test data for the innerliner ply material. Other tests and test apparatus may be used to achieve the necessary permeability values for the innerliner ply material as a function of thickness, area, and temperature.

The permeability of air through a rubber sample of an innerliner ply material can be represented by an air permeability coefficient Q where $$Q = \frac{\Delta V \times D}{A \times (P1 - P2) \times t}$$

The greater the permeability coefficient Q the greater the permeated volume $\Delta V$ of air through the sample in a given time t when the sample has a thickness D and a surface area A. The differential air pressure on the two sides of the sample is P1–P2.

The units of the permeability coefficient Q can be any English or Metric units convenient in the art. It is preferred to measure permeated volume $\Delta V$ in cubic centimeters, the innerliner ply thickness D in mils (0.001 inch), the area A in square meters, the pressure difference (P1–P2) in atmospheres (14.6969 psi) and time t in days. The resulting units used herein for Q become $cm^3 \cdot mil/m^2 \cdot atm \cdot day$.

The permeation of air in rubber is mainly a diffusion process. Permeation can be measured using either a constant pressure method test or a constant volume method test based on the well known ideal gas law, $P \cdot V = n \, R \cdot T$.

Figure 3:
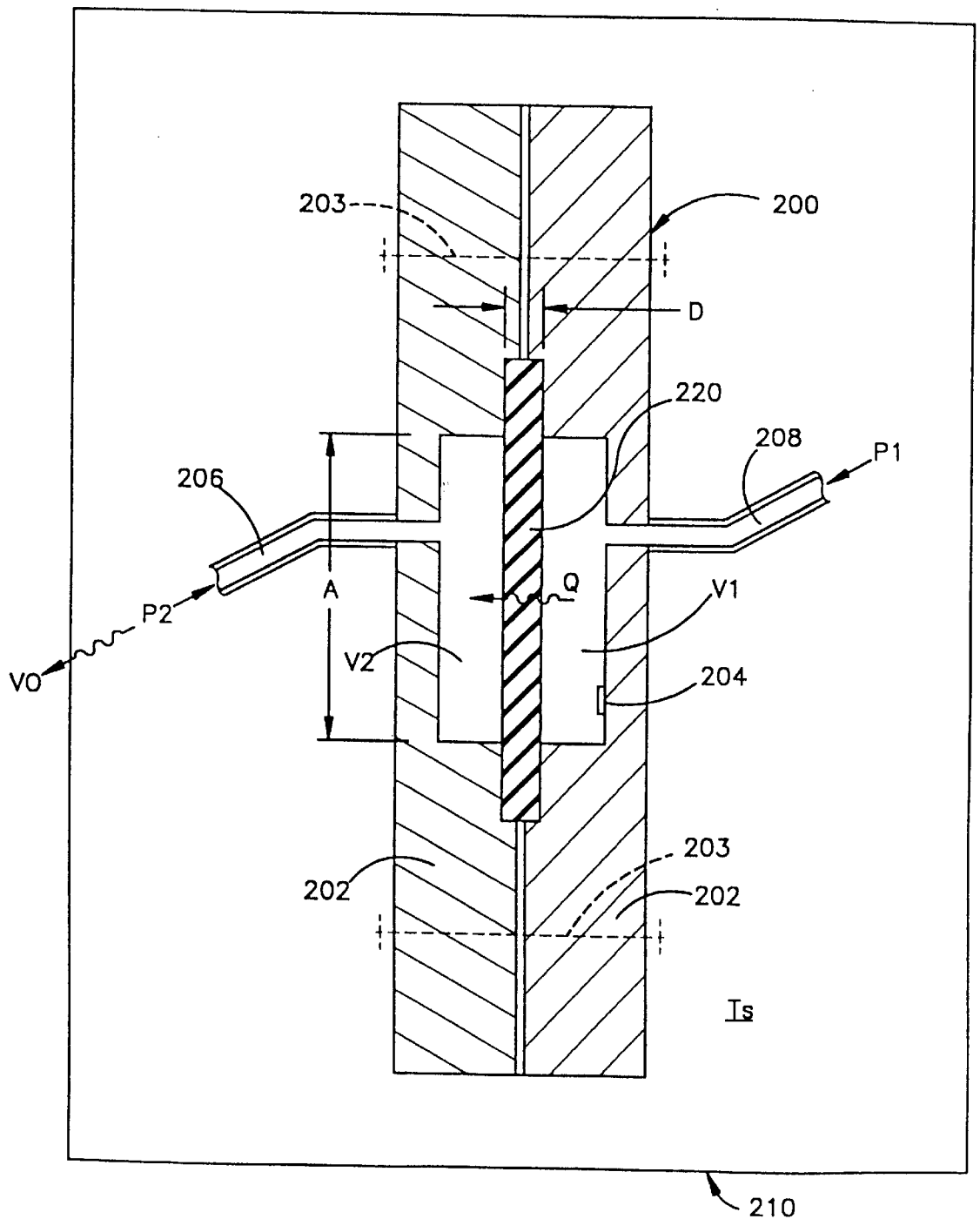
FIG. 3 is a schematic of a test apparatus to obtain permeability coefficients for innerliner ply samples.

In accordance with the method of the present invention, a constant volume measurement method and apparatus is preferably used to determine the air permeability of the innerliner ply in operation 108 and the preferred apparatus is illustrated in FIG. 3. By equating the ideal gas law for a constant volume method with the ideal gas law for a constant pressure method one obtains the relationship:

$$\frac{\Delta P \times Vs}{Ts} = \frac{Pa \Delta V}{Ta}$$

where system constants n and R have been eliminated as they are the same in both methods. Solving for the permeated volume $\Delta V$ from the constant volume Vs test apparatus system gives the relationship $$\Delta V = \frac{\Delta P}{Pa} \cdot \frac{Ta}{Ts} \times Vs$$

where $\Delta P$ is the pressure change within the volume Vs and Ts is the temperature (in degrees Kelvin) in the constant volume Vs. The pressure Pa and the temperature Ta are standard atmospheric conditions for air (one atmosphere and 273° K.). With the permeated volume $\Delta V$ substituted into the first equation above, the permeability coefficient Q is determined for the rubber sample of the material of the innerliner ply 20.

A schematic view of a constant volume test apparatus 200 is shown in FIG. 3. The test sample 220 is positioned between two members 202 held together by connectors 203 that allow a pressure difference P1–P2 between the two sides of the sample 220. The sample 220 has a thickness D and an area A which is subjected to a higher pressure P1 in volume V1 and a lower pressure P2 in volume V2. The pressure P1 is provided through conduit 208 and the pressure P2 is provided through conduit 206. The volume inside conduit 208 plus the volume V1 is maintained at a constant volume Vs for this constant volume test apparatus 200. A pressure change ΔP is measured for the constant volume Vs by sensor 204. A test temperature Ts is maintained within the total enclosure 210 during time t of the test. A small volume VO of air will be discharged from the enclosure 210 during the test to maintain the constant pressure difference (P1–P2) as the air permeates the sample; as indicated by the direction of the Q-arrow. All the parameters are available from the pressure test data and the size of the rubber sample 220 to determine the permeability coefficient Q at the test temperature Ts.

The test temperature Ts is a critical parameter in the amount of permeated volume ΔV of air through the sample 220. This is the basis for profiling the innerliner ply such that a variable thickness D compensates for the change in permeability due to temperature differences at different locations within the tire. As the permeability coefficient Q increases, the thickness D can be increased to keep the permeated volume ΔV the same.

The temperature Ts of the test apparatus 200 is selected to have a value near that of the innerliner ply temperature during nominal operational conditions of the vehicle. In fact, a number of permeability coefficient Q values may be required to correspond with the various anticipated temperatures of the innerliner ply. Very limited information is available in the literature on permeability of innerliner ply materials as a function of temperature. However, a functional relationship can be derived from the test data as herein described below.

The permeability of air in a material such as rubber is related to the diffusion of a gas within a solid mass. The coefficient of diffusion is corrected for temperature changes by using the well known Arrhenius equation. This equation shows that the diffusion coefficient is a nonlinear function of the temperature of the solid mass, where the temperature is in degrees Kelvin. Therefore, a first order approximation of the permeability coefficient Q can be expressed by an exponential relationship in the temperature T; herein referred to as a permeability relationship (Q vs. T)

$$Q = Qo \, e^{-k/T}$$

Figure 5:
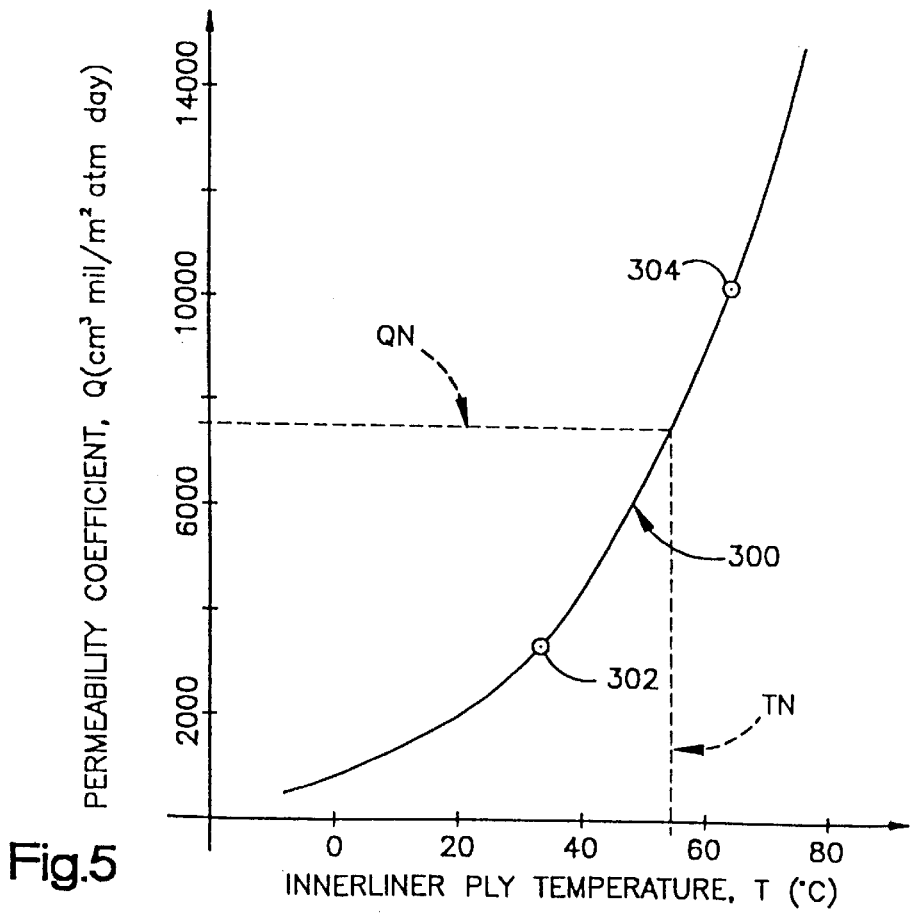
FIG. 5 is a plot of the permeability coefficient as a function of temperature for a typical halobutyl rubber material.

In this permeability relationship Qo and k are experimentally derived coefficients and the temperature T is in degrees Kelvin (273+°C.). At least two values $Q_1$, $Q_2$ of the permeability coefficient Q are necessary, from the test apparatus 200 or from reference material, to determine coefficients Qo and k. These values are necessarily at two different values of temperature $T_{s1}$ and $T_{s2}$. A permeability coefficient QN at other values of the innerliner ply temperatures TN can be calculated using this Q vs. T permeability relationship. FIG. 5 shows a typical plot of this permeability relationship. Data points 302 and 304 were used to obtain the Q vs. T relationship represented by the curve 300.

The next step in obtaining a profiled innerliner ply is to determine an average thickness of the innerliner ply. This is illustrated as operation 110 in FIG. 2. An average ply thickness is obtained based on the allowable loss rate of inflation pressure from operation 106 and using the permeability coefficients from operation 108. However, the operational temperatures of the tire are unknown and a tire inflation pressure loss model is required to represent the tire in question. The pressure loss model can be is the actual tire, having an innerliner ply of known thickness in a controlled temperature environment to simulate the nominal operational conditions of the tire. Alternately, the preferred model is an extension of the tire finite element model illustrated as operation 114 and which is discussed in more detail below. With either model, the operational temperatures within the tire are assumed, measured or estimated and a inflation pressure loss rate is obtained to compare with the allowable loss rate from operation 106. The average innerliner ply thickness is adjusted for an increase or a decrease in thickness to achieve the allowable value of inflation pressure loss rate.

Tire finite element models are well known in the art. These include thermodynamic tire models (operation 114) as well as those that obtain inflation pressure loss (operation 115) for a tire during nominal operating conditions of load, pressure, and ambient temperature. Nominal loads and inflation pressures are defined by a handbook from the Tire and Rim Association (T&RA) of Copley, Ohio for different tire size, shape, and use parameters. Typical finite element models having the ability to obtain internal temperatures within a tire, as well as inflation pressure loss rate values during nominal operating conditions, are available from Engineering Mechanics Research Corporation of Troy, Mich., for example.

Using the preferred tire finite element model of operation 114 and the innerliner ply thickness of operation 110 in FIG. 2, internal tire temperatures are obtained as illustrated in operation 112 for the tire of operation 102. Alternately, a prototype of the actual type tire can have temperature sensors installed to measure internal tire temperatures. If the tire's internal temperatures differ by a predetermined amount (for example, 1 degree Celsius) from those assumed or estimated during operation 110, a temperature adjustment should be made as indicated in operation 116. Operation 110 is repeated and a new average innerliner ply thickness determined until the tire temperatures of operation 112 essentially agree with those used in operation 110.

Internal tire temperatures within a tire 10 can be represented by temperature contour lines on a cross-section of the tire as illustrated in FIG. 4. The contours shown are typical of a 275/80R24.5 truck tire under nominal operating conditions of load and inflation pressure. Other tires may have contours that are quite different than those of FIG. 4. For example, a run-flat tire with crescent shaped sidewalls supporting members may have a maximum temperature at the mid-sidewall location. The profiled innerliner ply of this invention is particularly useful for truck tires of the type and size shown in FIGS. 1 and 4. Further discussions and an example for obtaining a profile for the innerliner ply will refer to the tire of FIG. 1. The method is essentially the same for other pneumatic tires.

The final operation 120 of FIG. 2 is an essential step in obtaining a profiled innerliner ply 20. In accordance with the method, the maximum and minimum internal tire temperatures at locations ID1–ID7 and ID51, as shown in FIG. 4, are taken into consideration in forming the profile of the innerliner ply 20. As a result, the innerliner ply has a plurality of sections D1–D7, each having a temperature in relation to the temperatures at internal locations ID1–ID7. Temperature increases are indicated by the arrows within the contoured cross-section. For example, maximum internal temperatures for a 275/80R24.5 truck tire can be to 110° C. at location ID5 and minimum internal temperatures as low as 45° C. at location ID4. Internal temperatures at the inside surface of the innerliner ply 20 can vary from 75° C. at locations D1 and D5 to 55° C. at location D3. The internal tire cavity temperature TC was about 62° C. Under these conditions, a 10 percent loss in the inflation pressure can be observed in 68 days with a constant thickness 2.26 millimeter innerliner ply 20.

A change or adjustment in the innerliner ply 20 thickness to correspond to the high and low temperature locations in the tire is represented by thickness locations D1–D7 in FIG. 1. Starting with an average ply thickness TA from operation 110 in FIG. 2, the innerliner ply thickness is reduced to a minimum value in relation to at least one lowest internal temperature location within the tire (i.e. values ID3 and ID4) and increased to a maximum value in relation to at least one highest internal temperature location within the tire (i.e. values ID1 and ID5). Intermediate thickness values can also be selected based on the same procedure as outlined herein.

The procedure for increasing and decreasing the average thickness TA of the innerliner ply 20 is based on the differences in the permeability coefficients Q as a result of the temperature variations of the innerliner ply 20. Having an average thickness TA and an average temperature DTA of the innerliner ply 20, the thickness TN at a location DN (N=1,2 - - -) where the innerliner ply is at a temperature value DTN is obtained from a thickness relationship:

$$TN = TA \frac{(Q \text{ AT TEMPERATURE } DTN)}{(Q \text{ AT TEMPERATURE } DTA)}$$

or $$TN = TA \times QN/QA.$$

The permeability coefficients QN, QA are obtained from the functional relationship between the permeability coefficient Q and the temperature T (Q vs. T) for the innerliner ply material, as disclosed previously in this description. As previously stated, a plot of such a relationship is shown in FIG. 5.

The values for the various innerliner ply thicknesses TN (N=1–7), at corresponding locations DN (N=1–7) in FIG. 1, are increased or decreased according to the above thickness relationship. This will not change the total air loss in a given time. However, those locations within the tire which have relatively higher temperatures will not be subjected to excessive air permeability that produces accelerated aging of the rubber materials. The innerliner ply thickness between the selected maximum and minimum thickness locations can be varied in accordance with any reasonable thickness change relationship. However, the preferred relationship is a linear thickness change between the designated thickness locations DN (N=1,2 - - -). The final result is a profiled innerliner ply in the tire with an average thickness to maintain inflation pressures loss rate above a threshold value and to help protect the highest temperature locations within the tire from accelerated aging. This invention could also be used to reduce the overall mass of the innerliner ply without significantly sacrificing air loss rate or durability.

EXAMPLE

A profiled innerliner ply of this invention was used in an 11R22.5 Michelin XZA-1 truck tire to obtain experimental evidence for the best mode to practice this invention. The tire 10 is illustrated in FIG. 1 showing a half cross-section having the profiled innerliner ply 20. The innerliner ply 20 was made using a halobutyl compounded rubber consisting of 100 percent bromobutyl rubber. The average thickness TA of the innerliner ply 20 was 2.50 millimeters and a tire inflation pressure loss model (operation 115 in FIG. 2) of the rolling tire 10 was used to obtain an air inflation pressure loss rate of 4 percent per month. A contained air temperature TC of 62° C. was determined by the model.

The permeability coefficient Q values were obtained using samples of the halobutyl innerliner ply rubber in a test apparatus similar to that illustrated in FIG. 3. With a first test apparatus temperature $T_{s1}$ at 35° C., a first set of permeability coefficient $Q_1$ values were recorded in a range of about 2450 to about 4600 using the units of cm$^3$·mil/m$^2$·atm·day. This range of values would encompass a number of possible blends of chlorobutyl and bromobutyl rubber that could be used for the innerliner ply of this 11R22.5 tire. For the tire of this example, a permeability coefficient $Q_1$ value of 3375 was used for the 100 percent bromobutyl material. That is, this bromobutyl material used in the innerliner has a mean permeated volume ($\Delta V$) of 3375 cubic centimeters over an area (A) of one square meter when there is a pressure difference (P1−P2) of one atmosphere (14.6969 psi) in one day (t) through a one mil (0.001 inch) sample thickness (D). The same tests at a second apparatus temperature $T_{s2}$ provides a second permeability coefficient $Q_2$. Alternately, a second permeability coefficient $Q_2$ value can be obtained from the literature. According to the Vanderbilt Rubber Handbook (13th edition) page 118, a $Q_2$ value of 10,205 at 65° C. was obtained using the same units as defined above (cm$^3$·mil/m$^2$·atm·day).

The two values of the permeability coefficient, $Q_1$=3375 and $Q_2$=10,205, were used to determine a change in the coefficient of permeability Q as a function of temperature T in degrees Kelvin (°K.). The change in permeability coefficient Q with temperature T relationship (Q vs. T) was determined for this example to give the permeability relationship $$Q = 8.79 \times 10^8 e^{-3840/T}$$

A plot of this permeability relationship is shown in FIG. 5. Values of the permeability coefficient (QN) for the various values of the innerliner ply temperature (DTN) can be determined using this Q vs. T plot. Points 302 and 304 on the curve 300 represent the two conditions used to determine the above permeability relationship.

A finite element model of the tire (operation 114 in FIG. 2) was used to obtain temperature contours of the tire; similar to those of FIG. 4. Innerliner ply 20 temperatures values DTN were obtained for ply locations adjacent to locations within the tire 10 having relatively high and low values of temperature. An average innerliner ply 20 temperature DTA was also determined from the temperature contours as 58° C.

The adjustment of the average thickness (TA=2.50 millimeters) of the innerliner ply 20 was made using the previously disclosed thickness relationship $$TN = TA \times QN/QA$$

where QA is the permeability coefficient Q at the average temperature DTA=58° (331° K.). Substituting the value of T=331 into the permeability relationship for this innerliner ply material of this example gives QA=8023. The data in Table 1 shows the calculation steps used to obtain the adjusted innerliner ply thickness values for the 11R22.5 truck tire of this example, as illustrated in FIG. 1. and FIG. 4.

TABLE 1

| Thickness Location | Temp. | Permeab. Coeff. QN | Ratio QN/QA* | Thickness Relation. TN | New Adj. Thickness |
|---|---|---|---|---|---|
| D1 | 67/340 | 10,908 | 1.360 | 3.40 | 3.2 |
| D2 | 61/334 | 8,905 | 1.110 | 2.77 | 2.7 |

TABLE 1-continued

| Thickness Location | Temp. | Permeab. Coeff. QN | Ratio QN/QA* | Thickness Relation. TN | New Adj. Thickness |
|---|---|---|---|---|---|
| D3 | 52/325 | 6,476 | 0.807 | 2.02 | 2.0 |
| D4 | 50/323 | 6,019 | 0.750 | 1.88 | 2.0 |
| D5 | 67/340 | 10,908 | 1.360 | 3.40 | 3.2 |
| D6 | 59/332 | 8,308 | 1.036 | 2.59 | 2.6 |

*QA = Permeability Coefficient for the innerliner ply materials at the average temperature DTA of 58° C.

The thickness relationship TN in Table 1 varies such that the smallest thickness is approximately 55 percent of the largest thickness. Actual values used for the tire of this example were conservatively chosen to give a smallest thickness of 2.0 millimeters and a largest thickness of 3.2 millimeters. These actual values are such that the smallest thickness is 62 percent of the largest thickness. With manufacturing tolerances this value would be about 60 to 65 percent.

Additional test results for truck tires showed that the preferred values for the smallest innerliner ply thickness is in a range of about 50 percent to about 70 percent of the largest ply thickness.

With some modifications in the innerliner ply materials to provide a blend of chlorobutyl rubber and bromobutyl rubber for improved or optimized permeability a smaller thickness of an innerliner ply was achieved. A minimum thickness of approximately 1.20 millimeters and a maximum thickness of not more than 2.50 millimeters was obtained for a heavy duty truck tire.

From the above description of a preferred embodiment of the invention, those skilled in the art will perceive improvement, changes and modifications which are intended to be covered by the appended claims.

What is claimed is:

1. A method for determining in a pneumatic tire a profiled thickness for an innerliner ply comprising the steps of:
    a) selecting a material for said innerliner ply of said tire;
    b) determining a permeability coefficient and an air permeability versus temperature relationship for said innerliner ply material;
    c) determining the temperatures of the innerliner ply of the tire at locations along the extent of the innerliner ply using simulated operating conditions of said tire;
    d) calculating a plurality of thickness values of said innerliner ply in relation to said locations based on a selected inflation pressure and loss rate of air permeating through the innerliner ply and respective temperatures of said innerliner ply; and
    e) forming said innerliner ply to have a thickness of the calculated thickness values for providing said profiled thickness for said innerliner ply.

2. The method set forth in claim 1, further including the steps of:
    a) determining a desired shape of said tire, an inflation pressure associated with said desired shape and a loss rate of said inflation pressure to maintain the desired shape of said tire by preselecting the permeability of air from the tire;
    b) said temperature determination step includes the step of modeling the tire to determine innerliner temperature values of the tire during rolling contact with a supporting surface at nominal conditions of load and inflation pressure of said tire; and
    c) said thickness calculation step includes calculating an innerliner ply thickness perpendicular to the cavity of the tire in relation to said respective innerliner temperature values of said innerliner ply in accordance with the permeability versus temperature relationship, wherein said profiled thickness varies between the calculated thickness locations.

3. The method set forth in claim 2, wherein said innerliner ply material is formed of a rubber compound selected from the class consisting of chlorobutyl rubber, bromobutyl rubber and blends thereof.

4. The method set forth in claim 3, wherein said rubber compound is a bromobutyl rubber having a glass transition temperature in the range of about 60° C. to about 65° C.

5. The method set forth in claim 2, wherein said step of calculating thickness values at respective locations includes the step of calculating thicknesses at the maximum and minimum innerliner temperature locations within the tire, said thicknesses defined by the shortest distance from an outer surface of the innerliner ply to the internal surface of the tire.

* * * * *